US009918430B2

(12) United States Patent
Roberge et al.

(10) Patent No.: US 9,918,430 B2
(45) Date of Patent: Mar. 20, 2018

(54) FOLDABLE TRIPLE FRONT DISK MOWER FOR SELF-PROPELLED WINDROWERS

(71) Applicant: CNH Canada, Ltd., Saskatoon (CA)

(72) Inventors: Martin J. Roberge, Saskatoon (CA); Luke J. Harris, Leola, PA (US)

(73) Assignee: CNH Industrial Canada, Ltd., Saskatoon (CA)

( * ) Notice: Subject to any disclaimer, the term of this patent is extended or adjusted under 35 U.S.C. 154(b) by 744 days.

(21) Appl. No.: 14/171,747

(22) Filed: Feb. 3, 2014

(65) Prior Publication Data

US 2015/0216121 A1    Aug. 6, 2015

(51) Int. Cl.
A01D 34/00   (2006.01)
A01D 41/14   (2006.01)
A01B 73/04   (2006.01)

(52) U.S. Cl.
CPC .......... *A01D 41/144* (2013.01); *A01B 73/042* (2013.01)

(58) Field of Classification Search
CPC ........ A01B 73/02; A01B 73/04; A01D 41/144
USPC ......... 56/6, 14.7, 15.7, 15.8, 192, 15.3, 219, 56/159, 228, 320.1, 134
See application file for complete search history.

(56) References Cited

U.S. PATENT DOCUMENTS

| | | | |
|---|---|---|---|
| 4,192,123 A * | 3/1980 | Allely | 56/13.6 |
| 4,355,690 A * | 10/1982 | Jensen et al. | 172/311 |
| 4,409,780 A * | 10/1983 | Beougher et al. | 56/228 |
| 5,279,100 A * | 1/1994 | Pruitt et al. | 56/1 |
| 5,430,997 A | 7/1995 | O'Halloran et al. | |
| 5,845,472 A * | 12/1998 | Arnold | 56/94 |
| 6,684,962 B1 * | 2/2004 | Lewallen | 172/311 |
| 6,862,873 B2 | 3/2005 | Franet | |
| 6,938,399 B2 | 9/2005 | Guiet | |
| 7,043,889 B2 * | 5/2006 | Rauch | 56/15.9 |
| 7,310,929 B2 | 12/2007 | Dow et al. | |
| 7,360,351 B2 * | 4/2008 | Rickert et al. | 56/228 |
| 7,543,433 B2 | 6/2009 | Hironimus | |
| 7,614,206 B2 | 11/2009 | Tippery et al. | |
| 7,971,417 B2 | 7/2011 | Link | |
| 8,919,088 B2 * | 12/2014 | Dow et al. | 56/192 |

(Continued)

FOREIGN PATENT DOCUMENTS

| | | |
|---|---|---|
| DE | 102004028537 A1 | 8/2005 |
| EP | 1183933 A1 | 6/2002 |

(Continued)

*Primary Examiner* — Thomas B Will
*Assistant Examiner* — Mai T Nguyen
(74) *Attorney, Agent, or Firm* — Peter K. Zacharias; Patrick M. Sheldrake (57) ABSTRACT

A foldable agricultural mower for preferable forward mounting on a tractor, the mower having a central cutterbar and at least one foldable wing cutterbar disposed on a first end of the central cutterbar. The foldable wing cutterbar is movable from an operable position that is generally in line with the central cutterbar to a folded position that is generally parallel to and spaced above the central cutterbar. A second wing cutterbar may be provided on the opposite end of the central cutterbar and similarly moveable between an operable position that is generally in line with the central cutterbar and a folded position that is generally parallel to and spaced above the central cutterbar, the second cutterbar being disposed above the first cutterbar when both are in the folded position.

18 Claims, 6 Drawing Sheets

(56) References Cited

U.S. PATENT DOCUMENTS

2004/0123575 A1* 7/2004 Rickert ........................ 56/14.7
2006/0196161 A1* 9/2006 Krone et al. .................... 56/228
2006/0254242 A1* 11/2006 Halter et al. .................... 56/228
2011/0173940 A1* 7/2011 Priepke ............................. 56/6

FOREIGN PATENT DOCUMENTS

GB    2321172 A1    7/1998
WO    9501715       1/1995

* cited by examiner

FOLDABLE TRIPLE FRONT DISK MOWER FOR SELF-PROPELLED WINDROWERS

BACKGROUND OF THE INVENTION

This invention relates generally to a machine for severing standing crops from the ground to initiate a harvesting process and, more particularly, to a mower having multiple cutterbars aligned end-to-end transverse to the machine and a means for repositioning the mower to reduce the transverse width of the mower.

In the interest of increasing mower operational efficiency, there is need to maximize the cutting width of the mower. The tractors commonly used on many mowing machines are capable of efficiently powering mowers having widths greater than the 12 to 14 foot width that is practically usable on a machine that must be operated on roads from time to time. One solution is to provide significantly wider mowers that are readily detachable from the tractor and transportable in longitudinal fashion (typically pulled on a trailer or the like with the header oriented 90 degrees from normal operation). It is also known to employ foldable mower portions that extend the operating width of the mower but may be repositioned to reduce the mower width for transport. Foldable options are limited for mowers in forward-mounted applications and mowers configured to be wholly supported by the tractor.

It would be advantageous to have a mower for use with an agricultural tractor that includes foldable cutterbar portions that may be deployed for a maximum cutting swath and folded into a compact width for transport. Further advantages would be realized by a foldable mower that could be wholly supported by a tractor and changes in the mower center of gravity as the mower is repositioned are minimized. Still further advantages would be realized by a foldable mower for forward mounting on a tractor that would fold into a sufficiently compact configuration for transport to minimize the impact on forward visability by the machine operator.

SUMMARY OF THE INVENTION

Accordingly, the present invention, in any of the embodiments described herein, may provide one or more of the following advantages:

It is an object of the present invention to provide a reconfigurable cutterbar for an agricultural mower enabling an operating width significantly greater than its transport width. In one embodiment, the present invention provides a cutterbar having movable folding portions disposed outboard of a central portion allowing the operating width to approach three times the transport width. The connection of the folding portions to the central portion allows the cutterbar to be easily repositioned for operation or transport.

It is a further object of the present invention to provide an agricultural mower header for forward mounting on a tractor that includes movable folding cutterbar portions disposed outboard of a central cutterbar portion which allows the operating width of the mower to be reduced for transport by folding the outboard portions to a position atop the central portion. The folding portions are positioned generally above the central portion when positioned for transport to maintain a low profile to minimize the impact on forward visability and to prevent the center of gravity of the folded mower from moving significantly forward compared to the center of gravity when configured for operation.

It is a further object of the present invention to provide an agricultural mower header for forward mounting on a tractor that includes movable folding cutterbar portions disposed outboard of a central cutterbar portion. The folding portions are disposed generally above the central portion when positioned for transport. Each cutterbar portion is partially enclosed by a shroud to control the movement of cut crop material and to arrest airborne projectiles launched by impact with the cutterbar. The shrouds are collapsible to reduce the height above the cutterbar portions so that overall height of the mower header when the outboard portions are folded is minimized.

It is a still further object of the present invention to provide an agricultural mower header for forward mounting on a tractor that includes movable folding cutterbar portions disposed outboard of a central cutterbar portion that is sufficiently light in weight to enable forward mounting on existing forward mower mount tractors without significant modification.

It is a still further object of the present invention to provide a foldable cutterbar for an agricultural mower that is durable in construction, inexpensive of manufacture, carefree of maintenance, easily assembled, and simple and effective to use.

These and other objects are achieved in accordance with the instant invention by a foldable agricultural mower for preferable forward mounting on a tractor, the mower having a central cutterbar and at least one foldable wing cutterbar disposed on a first end of the central cutterbar. The foldable wing cutterbar is movable from an operable position that is generally in line with the central cutterbar to a folded position that is generally parallel to and spaced above the central cutterbar. A second wing cutterbar may be provided on the opposite end of the central cutterbar and similarly moveable between an operable position that is generally in line with the central cutterbar and a folded position that is generally parallel to and spaced above the central cutterbar, the second cutterbar being disposed above the first cutterbar when both are in the folded position.

BRIEF DESCRIPTION OF THE DRAWINGS

The advantages of this invention will be apparent upon consideration of the following detailed disclosure of the invention, especially when taken in conjunction with the accompanying drawings wherein.

DESCRIPTION OF THE PREFERRED EMBODIMENT(S)

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Likewise, "forward" and "rearward" are determined by the normal direction of travel. "Upward" and "downward" orientations are relative to the ground or operating surface as are any references to "horizontal" or "vertical" planes. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures.

Referring now to the drawings and particularly to FIGS. 1 through 4, a typical self-propelled agricultural harvesting machine comprising a tractor 10 with a forwardly disposed mowing header 20 is presented. Such agricultural harvesting machines are well-known in the art for offering an efficient means for harvesting crop. The mowing header 20 includes a disc cutterbar 30 disposed adjacent the forward end of the header 20 to sever a standing crop from the ground. The disc cutterbar 30 includes a plurality of transversely spaced disc cutter modules 39, each configured for rotation about a generally vertical axis. Each disc cutter module 39 has two or three knives that are rotated by the module to sever the standing crop from the ground through an impact action. Rotation of the cutter modules is typically synchronized to allow a continuous swath of crop to be cut without the risk of individual knives on adjacent cutter modules from coming in contact with each other. To this end, the cutter modules 39 on a given cutterbar are typically driven by a limited number of drives 300 powered by the tractor using conventional means. For background information on the structure and operation of disc cutterbars, reference is made to U.S. Pat. No. 4,815,262, issued to Koch et al. and to U.S. Pat. No. 5,996,323, issued to Campbell et al., the descriptive portions thereof being incorporated herein in full by reference.

The mowing header 20 is shown forwardly mounted on the specialized tractor as is common practice to provide a highly maneuverable harvesting machine. Such headers may also be forwardly or rearwardly mounted on conventional tractors as well. In all such applications, the location of the header center of gravity must be maintained sufficiently close to the tractor axle 15 which primarily supports the header to allow proper operation of the tractor. Consequently, overall header weight and changes in the center of gravity location as headers are reconfigured for operation or transport are important design considerations.

Referring to generally to FIGS. 2 through 10, a folding mower 20 embodying aspects of the present invention is shown. The mower comprises a laterally extending cutterbar 30 disposed along a transverse axis 100 at the leading end of the mower 20. The extent of the cutterbar 30 defines the cutting width, or swath, of the mower. The cutterbar 30 comprises a central portion 31 which is supported by a frame 21 connected to the tractor 10. Left folding portion 32 and right folding portion 33 are disposed on opposite ends 212, 213 of the central portion 21, each having a necessary frame 22, 23 to support the folding cutterbar portion 32, 33 and enable connection the central portion 31 frame 21. Each cutterbar portion includes at least one power module 300, such as a hydraulic motor, to provide rotational power to the cutter modules on the cutterbar portion. As used herein, the term cutterbar comprises the cutting apparatus and the framework necessary to support the cutting apparatus and connect the apparatus to the tractor.

Left and right folding joints 40, 50 connect the respective frames of left and right folding portions 32, 33 to the central portion 31. Each folding joint 40, 50 enables the respective folding portion to be moved between generally opposing operable (see FIG. 5) and folded positions (see FIG. 7) as illustrated by directional arrows "A" and "B" (see FIG. 6). The folding portions 32, 33 are each generally aligned along the transverse axis 100 when in the operable position to form a generally continuous cutting apparatus across the transverse width. When moved into the folded position, each folding portion 32, 33 is aligned generally parallel to and spaced apart above the central portion 31 (see FIG. 7). In order to minimize obstruction of forward lines of sight, the vertical spacing between the cutterbar portions is kept to a minimum resulting in a generally stacked arrangement of the cutterbar portions.

It is also contemplated that the cutterbar 30 could be arranged so that synchronization of the adjacent rotary cutters is not required, allowing alternative drive means. This is accomplished in one embodiment by horizontally shifting the alignment of alternating rotary cutters a small distance from the nominal transverse axis 100, resulting in some being aligned slightly forward along leading axis 101 and others being aligned slightly rearward of the nominal transverse on trailing axis 102 (see FIG. 3). U.S. Pat. No. 8,490,371 issued to Roberge discloses an electrically driven modular rotary cutterbar on which adjacent rotary cutters are staggered fore-and-aft from a nominal transverse axis 100 to prevent knife strikes while producing a continuous cutting swath along the lateral extent of the cutterbar. Currently pending application Ser. No. 13/782,718, "Control System For A Disc Cutterbar Using Cut Quality Feedback," filed on Mar. 1, 2013 and Ser. No. 13/917,956, "Modular Electric Disc Cutterbar and Controller," filed on Jun. 14, 2013 also disclose cutterbar configurations that may be easily adapted for the present invention. The descriptive portions of the above patent and pending applications are incorporated herein by reference.

Figure 1:
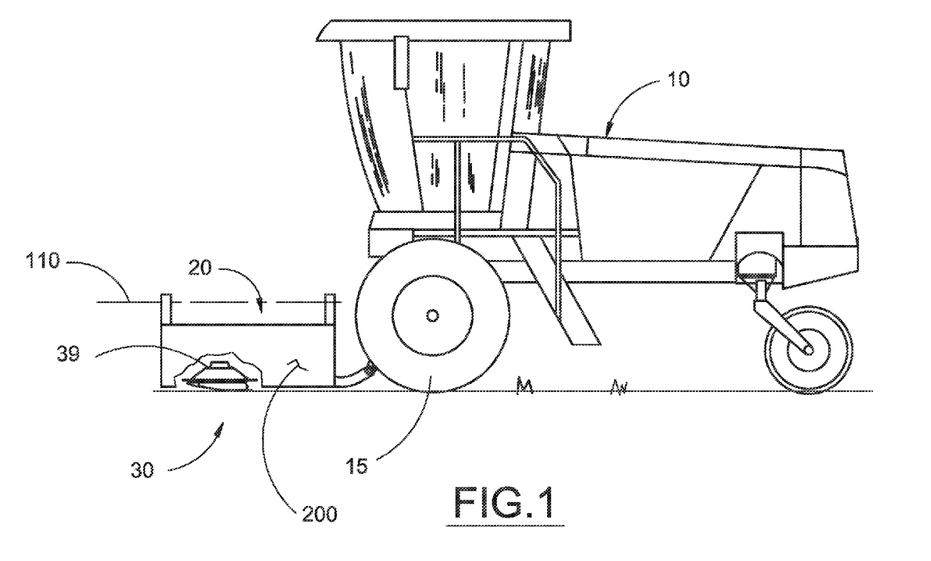
FIG. 1 is a side view of a self-propelled agricultural harvester of the type on which the present invention is useful, the harvester having a forwardly disposed mower header.
Figure 2:
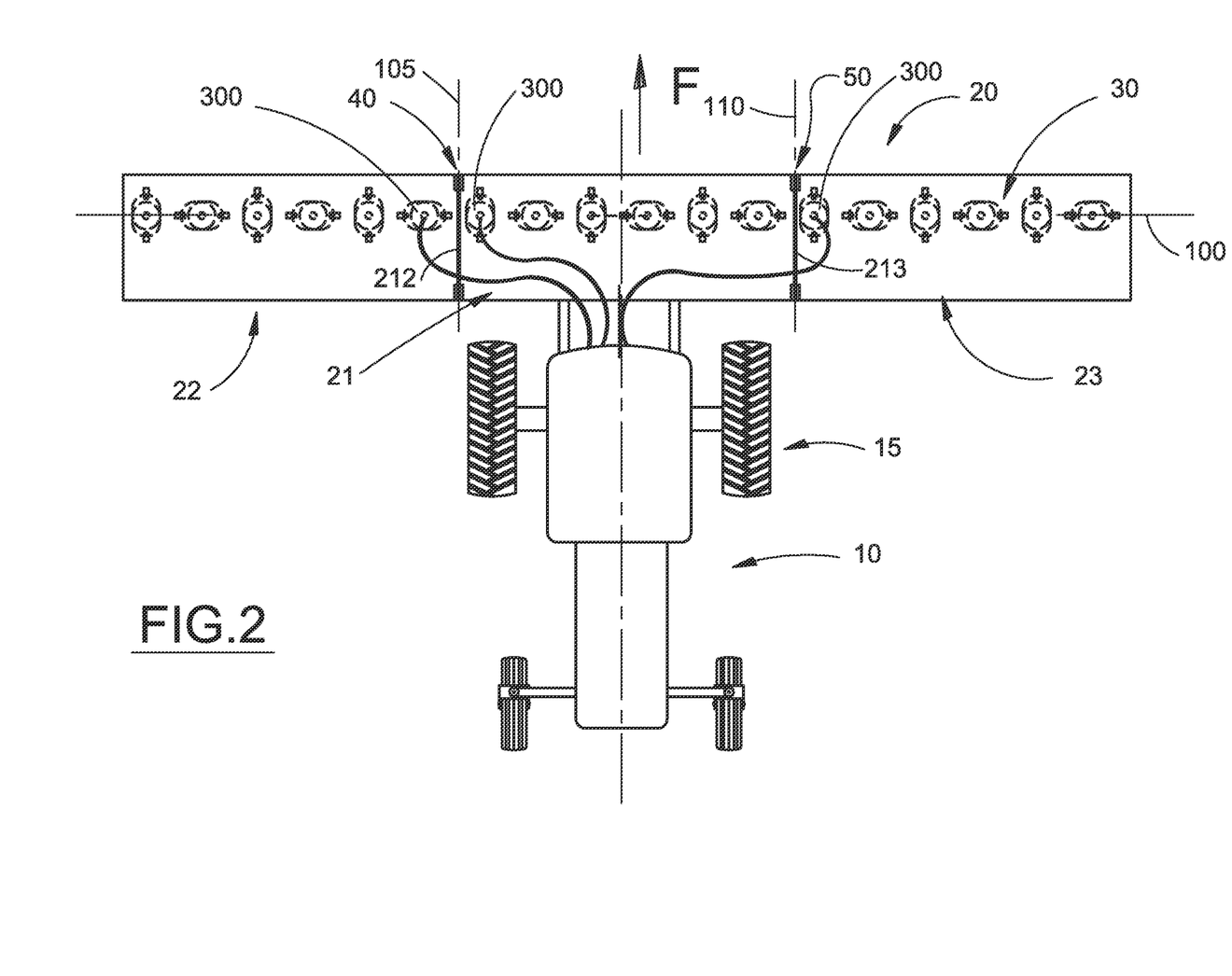
FIG. 2 is a plan view of the harvester of FIG. 1.
Figure 3:
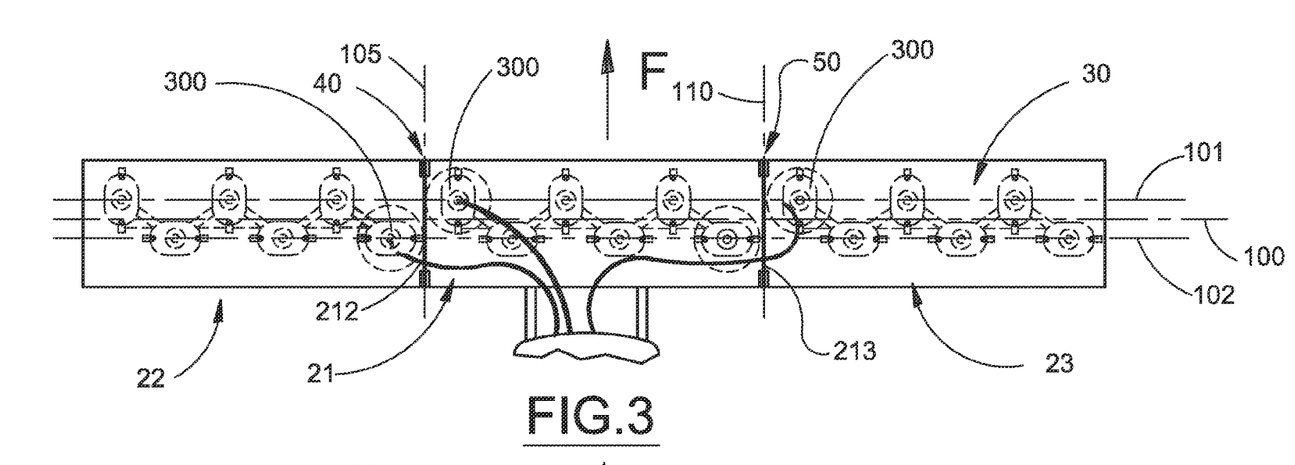
FIG. 3. is a plan view of a first alternate cutterbar arrangement in a mower header.
Figure 4:
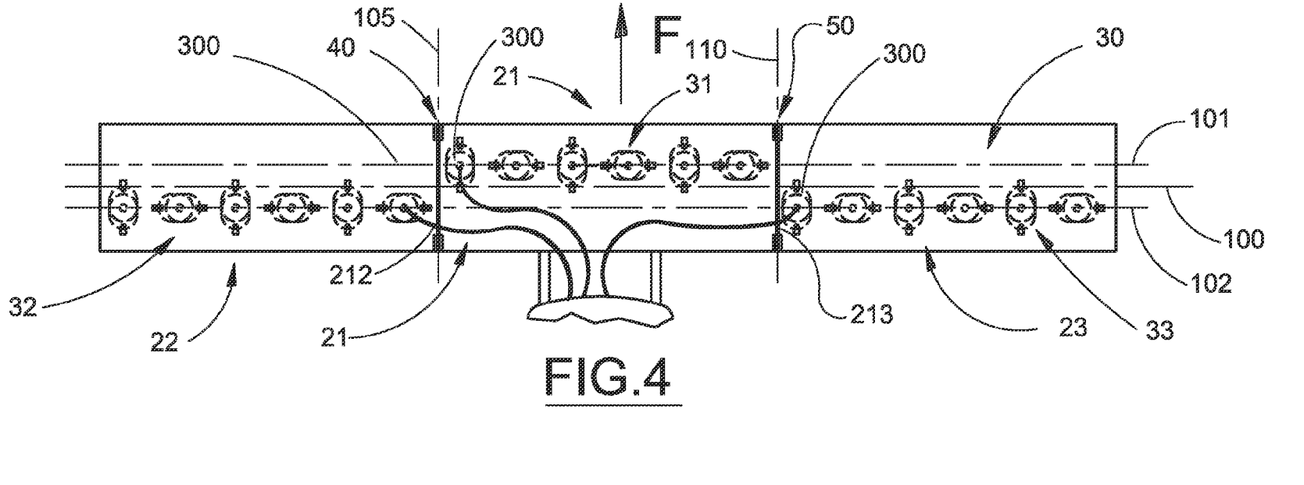
FIG. 4 is a plan view of a second alternate cutterbar arrangement in a mower header.
Figure 5:
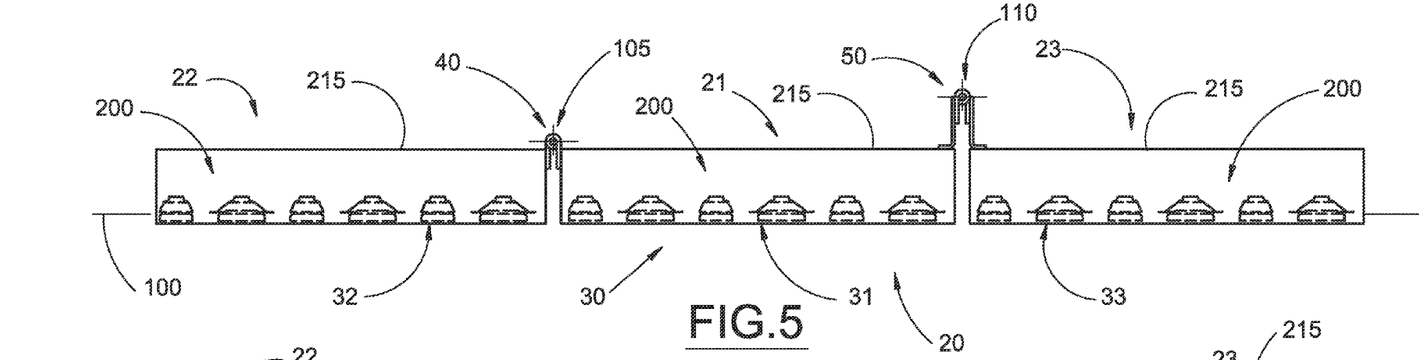
FIG. 5 is a section view of the mower header of FIG. 1 showing the cutterbar aligned for operation.
Figure 6:
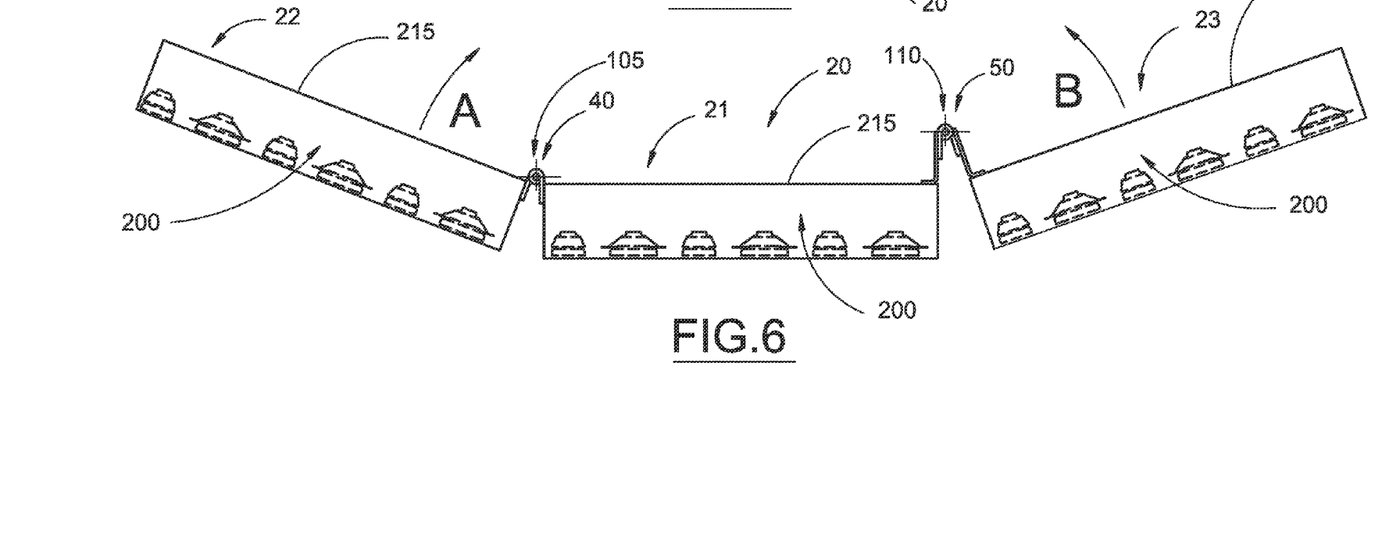
FIG. 6 is a section view of the mower header of FIG. 5 showing the cutterbar as it is being folded.
Figure 7:
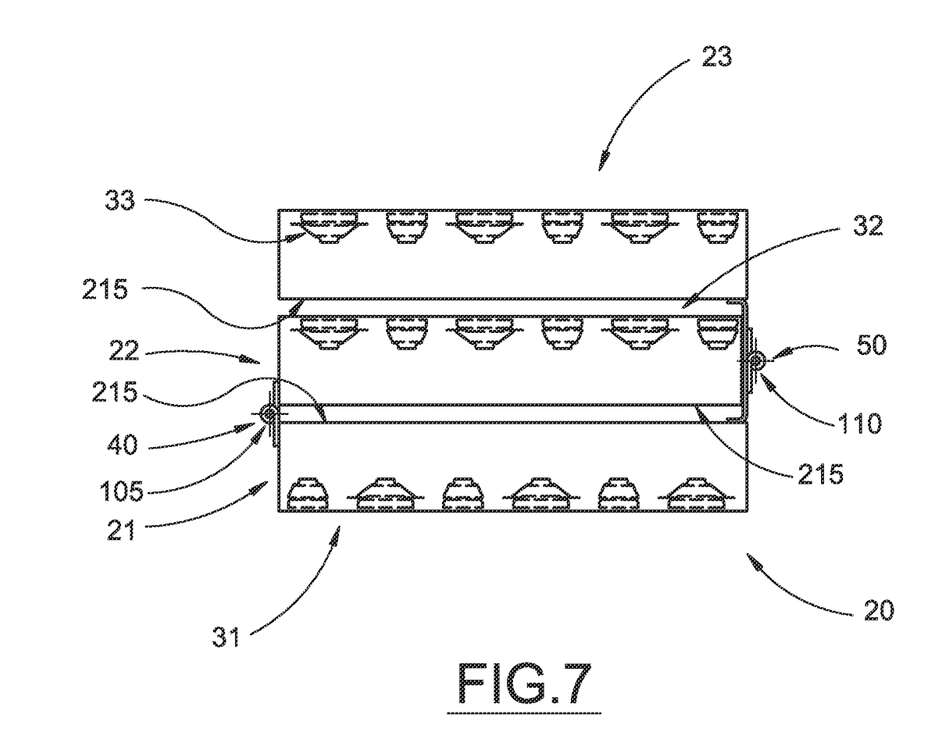
FIG. 7 is a is a section view of the mower header of FIG. 5 showing the cutterbar in the fully folded position.

It is further contemplated that the cutterbar could be divided into portions with rotation of the cutterheads in each portion being synchronized, but no rotational synchronization between adjacent portions. As shown in FIG. 4, the cutterbar portions may be longitudinally offset slightly so that knives from the cutterheads in adjacent portions will not come in contact. In this embodiment, the cutterheads in the central portion 31 are aligned on leading axis 101 while cutterheads in the outboard portions 32, 33 are aligned on trailing axis 102. It is preferable to maintain the longitudinal spacing between the leading and trailing axes 101, 102 to approximately the outer diameter of the rotary cutterheads, including the knives or less. As used herein, a cutterbar aligned on a transverse axis 100 includes cutterbars in which adjacent rotary cutters are staggered as described. The descriptive portions of the Roberge patent are incorporated herein by reference.

The folding joints 40, 50 may be hinge-like mechanisms that enable pivotal movement of the outboard frames 22, 23 about respective folding axes 105, 110 that are generally perpendicularly aligned with the transverse axis 100 to enable the folding portions 32, 33 to remain generally transversely aligned when in the folded position. The vertical separation from the transverse axis 100 of the central portion to the right folding joint axis 105 and left folding joint axis 110 differs between the right and left sides to allow the folding portions to fold into positions with one generally above the other. This stacked arrangement when the folding portions 32, 33 are in the folded position maintains the overall height of the folded mower at a minimum. Other linkages as may be developed by one skilled in the art enabling connection of the folding portions and folding movement from an operable position in line with the transverse axis to a folded position that is generally parallel to and above the transverse axis are contemplated. Furthermore, the upper-lower positioning of the respective folding portions may be alternated to position either the right side or left side portion on the top of the folded mower.

Figure 8:
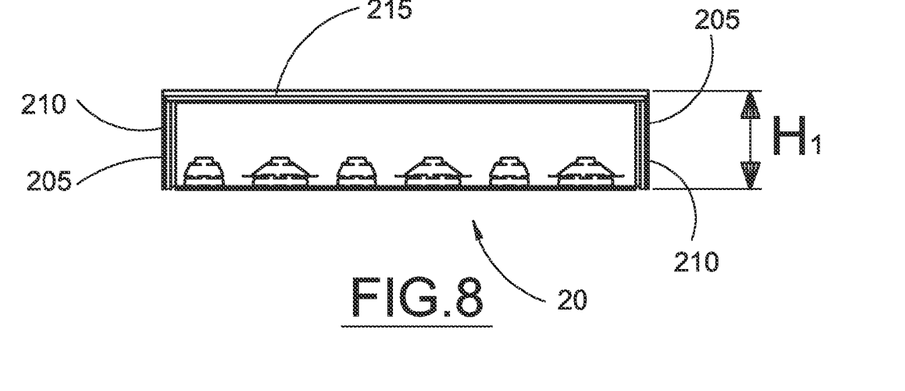
FIG. 8 is a section view of a portion of the mower header showing a shroud cover fully extended for operation.
Figure 9:
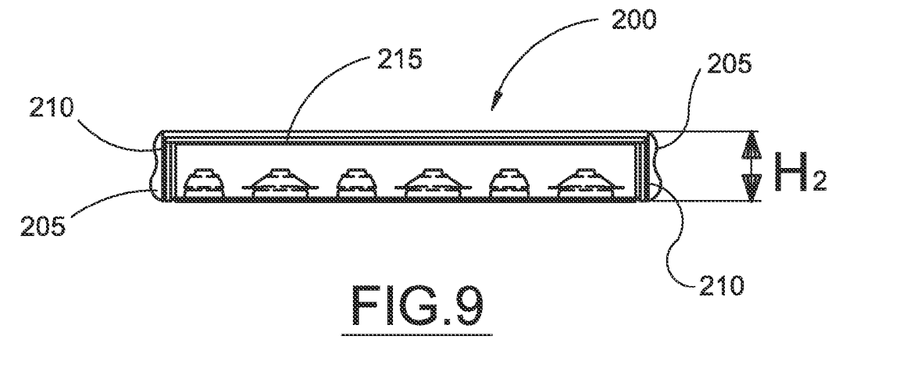
FIG. 9 is a section view of a portion of the mower header of FIG. 8 showing the shroud cover in a collapsed position for folding and transport.
Figure 10:
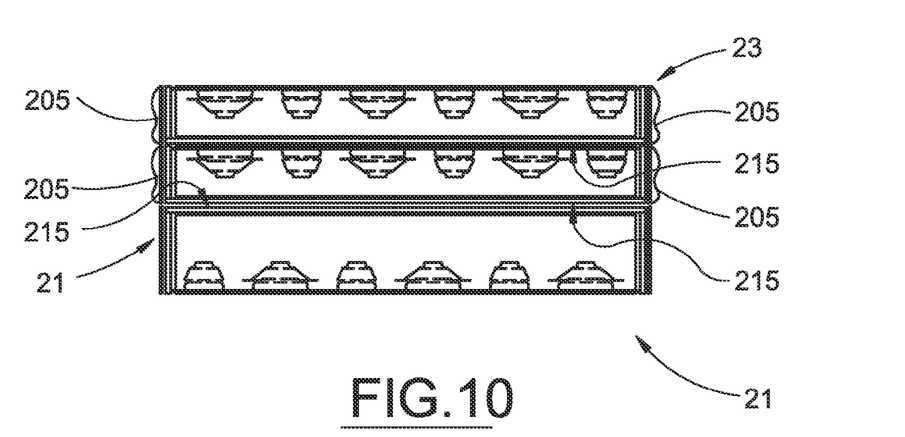
FIG. 10 is a section view of the mower header in the folded position showing the relation of the header portions using collapsed shroud covers.

The mower is provided with a shroud 200 that partially encloses the cutterbar portions to control the movement of cut crop material from the cutterbar and to arrest airborne projectiles that may be launched by impact with the cutterbar. The shroud 200 typically includes a generally horizontal top cover 215 extending above the cutterbar and one or more generally vertical side walls 205 that surround the transverse ends and a portion of the trailing side of the mower. The side walls 205 may also partially extend downwardly from the top cover 215 along the leading end of the mower to increase protection from airborne projectiles. In one embodiment, the side walls 205 of the shroud may be collapsible to reduce the height of the top cover 215 above the cutterbar 30 and allow the overall height of the mower to be reduced as illustrated in FIGS. 8 through 10. FIG. 8 shows the shroud at an operable height $H_1$ above the cutterbar which provides space for cut crop material movement. In FIG. 9, the top cover 215 is lowered by the collapsing movement of the side walls 205 to a reduced height, $H_2$, which is less than $H_1$. The collapsing movement of the side walls 205 may be by flexible side wall panels that are easily foldable, such as high-strength fiber reinforced materials, chain-mail panels, and the like, or an arrangement of folding or moveable rigid panels that enable the top panel to be lowered in relation to the cutterbar while providing a barrier along the sides of the mower. A moveable frame 210 is provided to support the top cover 215 and side walls 205 and structurally connect to the mower frame. Reducing the height of the top cover allows the overall height of the mower header when the outboard portions are folded to be minimized (see FIG. 10). Collapsible side walls may be incorporated on one or more of the cutterbar portions to further reduce the height of the mower when in the folded position and improve forward visibility for front-mounted mowers. Additionally, mower weight may be reduced by replacing conventional steel side walls with a lighter weight, flexible material.

Naturally, the invention is not limited to the foregoing embodiments, but it can also be modified in many ways without departing from the basic concepts. It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. An agricultural mower header comprising:
   an elongate first cutterbar;
   an elongate second cutterbar disposed at a first end of the first cutterbar;
   an elongate third cutterbar disposed at a second end of the first cutterbar opposite of the first end;
   a first folding joint disposed at the first end connecting the first and second cutterbars; and
   a second folding joint disposed at the second connecting the first and third cutterbars;
   the first folding joint configured to enable movement of the second cutterbar between an operable position wherein the first and second cutterbars horizontally extend generally transversely, and a folded position wherein the first and second cutterbars are generally parallel and vertically spaced apart;
   the second folding joint configured to enable movement of the third cutterbar between an operable position wherein the first and third cutterbars horizontally extend generally transversely, and a folded position wherein the first and third cutterbars are generally parallel and vertically spaced apart, the third cutterbar being above the second cutterbar when both are in the folded position, and
   a shroud having a top cover disposed generally above at least one of the cutterbars and at least one side wall, the top cover being moveable toward the at least one of the cutterbars by a collapsing movement of the side wall.

2. The mower header of claim 1, wherein the first and second folding joints are aligned to enable folding about folding axes that are generally perpendicular to the first cutterbar.

3. The mower header of claim 2, wherein the first and second folding joints are hinges.

4. The mower header of claim 1, wherein the at least one side wall is made from a flexible material.

5. The mower header of claim 1, wherein the at least one side wall is made from a plurality of rigid panels that are operable to fold in relation to each other.

6. The mower header of claim 1, further comprising a moveable frame supporting the top cover and the side wall.

7. An agricultural mower comprising:
   a generally horizontally extending cutterbar having a central portion with generally opposing first and second ends, a first wing portion, and a second wing portion;
   a first folding joint connecting the first wing portion to the first end of the central portion operable to enable movement of the first wing portion between an operable position wherein the central portion and the first wing portion are generally transversely aligned, and a folded position wherein the first wing portion is generally parallel to and above the central portion; and
   a second folding joint connecting the second wing portion to the second end of the central portion, the second folding joint operable to enable movement of the second wing portion between an operable position wherein the central portion and the second wing portion are generally transversely aligned, and a folded position wherein the second wing portion is generally parallel to and above the central portion, the second wing portion being above the first wing portion when both are in the folded position, and a shroud having a top cover disposed generally above at least one of the cutterbars and at least one side wall, the top cover being moveable toward the at least one of the cutterbars by a collapsing movement of the side wall.

8. The mower of claim 7, wherein the first and second folding joints are aligned to enable folding about folding axes that are generally perpendicular to the central portion.

9. The mower of claim 8, wherein the first and second folding joints are hinges enabling pivotal movement of the first and second wing portions.

10. The mower of claim 7, wherein the at least one side wall is made from a flexible material.

11. The mower of claim 7, wherein the at least one side wall is made from a plurality of rigid panels that are operable to fold in relation to each other.

12. A mower for mounting on an agricultural tractor at a position spaced apart from a load supporting axle, the mower comprising:
   a central cutterbar extending along a generally transverse axis, the central cutterbar having generally opposing first and second ends;
   a first wing cutterbar;
   a second wing cutterbar;
   a first folding joint connecting the first wing cutterbar to the first end operable to enable movement of the first wing cutterbar between and operable position wherein the first wing cutterbar is generally aligned on the transverse axis and a folded position wherein the first wing cutterbar is aligned generally parallel to and spaced above the transverse axis;
   a second folding joint connecting the second wing cutterbar to the second end operable to enable movement of the second wing cutterbar between and operable position wherein the second wing cutterbar is generally aligned on the transverse axis and a folded position wherein the second wing cutterbar is aligned generally parallel to and spaced above the transverse axis, the second wing cutterbar being above the first wing cutterbar when both are in the folded position, the first and second folding joints configured to minimize changes in horizontal separation from the load supporting axle to the mower center of gravity when positioned in the folded positions, and
   a shroud having a top cover disposed generally above at least one of the cutterbars and at least one side wall, the top cover being moveable toward the at least one of the cutterbars by a collapsing movement of the side wall.

13. The mower of claim 7, further comprising a moveable frame supporting the top cover and the side wall.

14. The mower of claim 12, wherein the first and second folding joints are aligned to enable folding about folding axes that are generally perpendicular to the central cutterbar and the first and second wing cutterbars are positioned generally vertically above the central cutterbar when in the folded positions.

15. The mower of claim 14, wherein the first and second folding joints are hinges enabling pivotal movement of the first and second wing cutterbars in relation to the central cutterbar.

16. The mower of claim 12, wherein the at least one side wall is made from a plurality of rigid panels that are operable to fold in relation to each other.

17. The mower of claim 12, wherein the at least one side wall is made from a flexible material.

18. The mower of claim 12, further comprising a moveable frame supporting the top cover and the side wall.

* * * * *